(12) United States Patent
Wills et al.

(10) Patent No.: US 9,796,880 B2
(45) Date of Patent: Oct. 24, 2017

(54) HIGH-SOLIDS COATING COMPOSITION

(71) Applicant: AKZO NOBEL COATINGS INTERNATIONAL B.V., Arnhem (NL)

(72) Inventors: Trevor Michael Wills, Tyne and Wear (GB); Doug Beaumont, Tyne and Wear (GB); David Ring, Tyne and Wear (GB); Tobias Stein, Durham (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/897,315

(22) PCT Filed: Jun. 13, 2014

(86) PCT No.: PCT/EP2014/062305
§ 371 (c)(1),
(2) Date: Dec. 10, 2015

(87) PCT Pub. No.: WO2014/202466
PCT Pub. Date: Dec. 24, 2014

(65) Prior Publication Data
US 2016/0145468 A1    May 26, 2016

(30) Foreign Application Priority Data
Jun. 17, 2013  (EP) .................... 13172339

(51) Int. Cl.
| | | |
|---|---|---|
| *C08G 77/00* | (2006.01) |
| *C08L 63/00* | (2006.01) |
| *C08L 83/00* | (2006.01) |
| *C09D 183/08* | (2006.01) |
| *C09D 5/03* | (2006.01) |
| *C09D 5/00* | (2006.01) |
| *C09D 5/10* | (2006.01) |
| *C09D 5/08* | (2006.01) |
| *C09D 5/12* | (2006.01) |
| *C08G 77/04* | (2006.01) |
| *C08G 77/14* | (2006.01) |
| *C08G 77/26* | (2006.01) |

(52) U.S. Cl.
CPC ........... *C09D 183/08* (2013.01); *C09D 5/002* (2013.01); *C09D 5/038* (2013.01); *C09D 5/08* (2013.01); *C09D 5/103* (2013.01); *C09D 5/12* (2013.01); *C08G 77/045* (2013.01); *C08G 77/14* (2013.01); *C08G 77/26* (2013.01)

(58) Field of Classification Search
CPC ...... C09D 5/038; C09D 183/08; C09D 5/002; C09D 5/103; C09D 5/08; C09D 5/12; C08G 77/045; C08G 77/14; C08G 77/26
USPC .................. 523/457; 525/523, 476
See application file for complete search history.

(56) References Cited

U.S. PATENT DOCUMENTS

| | | | | |
|---|---|---|---|---|
| 2002/0010270 A1* | 1/2002 | Czech | ..................... | C08L 83/08 525/100 |
| 2006/0058451 A1* | 3/2006 | Gommans | ............... | C08L 83/10 524/588 |
| 2006/0205861 A1* | 9/2006 | Gordon | ................... | C08L 83/08 524/506 |

* cited by examiner

*Primary Examiner* — David Karst
(74) *Attorney, Agent, or Firm* — McDonnell Boehnen Hulbert & Berghoff LLP

(57) ABSTRACT

The present invention pertains to a coating composition based on a specific epoxy-functional siloxane oligomer and an amine-functional polyorganosiloxane. The coating composition is suitable for use on substrates subjected to outdoor conditions, in particular conditions where a high durability, a high UV resistance, and good anti-corrosive properties are required.

20 Claims, No Drawings

HIGH-SOLIDS COATING COMPOSITION

REFERENCE TO RELATED APPLICATIONS

This application is the U.S. National Phase of PCT/EP2014/062305, filed on Jun. 13, 2014, which is incorporated herein by reference it its entirety, and which claims the benefit of EP Application No. 13172339.7, filed on Jun. 17, 2013.

The present invention pertains to high-solids coating compositions, in particular high-solids coating compositions based on silicone resins which are suitable for use on substrates subjected to outdoor conditions, in particular conditions where a high durability, a high UV resistance, and good anti-corrosive properties are required.

Coating compositions based on silicone resins are known in the art. Silicone resins may be interchangeably referred to organosiloxane or polyorganosiloxane resins/polymers in the art.

WO2005/033219 describes a coating composition comprising at least two types of functional polysiloxane compounds selected from epoxy-functional polysiloxanes, amine-functional polysiloxanes, and siloxane adhesion promoting agents.

EP186839 describes polyorganosiloxane compositions for surface treatment comprising a polydiorganosiloxane the terminal units of which are blocked by hydroxy groups, a curing agent which comprises a mixture or a partially reacted mixture of a polyorganosiloxane substituted with monovalent hydrocarbyl groups substituted by an epoxy-containing group and a silane and/or a siloxane having a substituted or unsubstituted amine group bonded to a silicon atom via at least one carbon atom and having at least one alkoxy group bonded to a silicon atom, and a polymethyl-silsesquioxane having a mean particle diameter of 0.1 to 100 micron. JP2233763 describes a variation on this composition.

U.S. Pat. No. 4,252,933 describes a self-bonding polysiloxane coating composition having a hydroxyl end-blocked polydiorganosiloxane polymer and a polysiloxane having epoxy functional groups mixed with an amine-functional silicone compound.

U.S. Pat. No. 4,996,112 describes organopolysiloxane compositions containing at least one alpha-, omega-dihydroxydiorganopolysiloxane polymer; at least one ketiminoxysilane crosslinking agent therefore, and a bonding agent including a mixture or reaction product of an aminoorganosilicon compound containing a primary amine group with an organosilicon compound containing an epoxy functional group.

WO01/70886 describes a silicone amine-epoxy crosslinking system comprising an amine-modified organopolysiloxane and an epoxy-modified organopolysiloxane.

EP 0 469 316 discloses an aqueous dispersion suitable for coating textiles comprising an epoxy functional polysiloxane and an amino functional polysiloxane.

It has been found that there is particular need in the art for coating compositions with a high solids content and/or a low VOC which upon application show a short drying time in combination with an adequate viscosity and a suitable pot life, which provide good protection against corrosion, in combination with UV durability, upon long term exposure, as can be seen from high gloss retention and a low Delta E. There is also need in the art for a system that can be used as a primer/finish, as this makes for an efficient coating operation requiring less different coating layers.

The present invention provides such a coating composition. The above noted prior art disclosures fail to disclose or suggest the advantages of a coating composition comprising the specific combination of the epoxy-functional siloxane oligomer and the amine-functional polyorganosiloxane of the present invention. In particular the above prior art disclosures fail to disclose an epoxy-functional siloxane oligomer having a low degree of polymerization and high reactive group (epoxy) functionality in combination with an amine-functional polyorganosiloxane having a higher degree of polymerization and a lower reactive group (amine) functionality.

The invention pertains to a coating composition comprising an amine-functional polyorganosiloxane having an average degree of polymerization of 10 or more, and an epoxy-functional organosiloxane oligomer, wherein the epoxy-functional siloxane oligomer comprises units selected from the group of:

  (i)

  (ii)

  (iii)

  (iv)

  (v)

  (vi)

wherein
each of a, b, c, d, e and f can be independently 0 or an integer;
the number average of the number of units a+b+c+d+e+f in the epoxy-functional organosiloxane oligomer ranges from 2 to 9;
number average of a+b+e≥2
the $R^1$ groups can be the same or different and each represent a monovalent hydrocarbon radical having 1-9 carbon atoms, or a $C_1$-$C_6$-alkoxy group,
the $R^2$ groups can be the same or different and each represent an OH group or a $C_1$-$C_6$-alkoxy group,
the $R^3$ groups can be the same or different and each represent a monovalent hydrocarbon radical having 1-11 carbon atoms each $R^3$ group substituted with at least one epoxy group,
wherein an average of at least 70% of the units of the epoxy-functional organosiloxane oligomer comprise an $R^3$ group,
and wherein the amounts of the amine-functional polyorganosiloxane and the epoxy-functional organosiloxane oligomer are such that the ratio of active hydrogen equivalents to epoxy equivalents in the coating system is between 0.3:1 to 1.1:1.

For the avoidance of doubt, unless it is otherwise stated, the average percentage (%) of units in a polymer/oligomer is the average calculated by number.

It has been found that in the coating composition of the present invention is capable of having a high solids content and/or a low VOC. By high solids content and/or a low VOC we mean that the coating composition may have a solids content of at least 70 weight % and/or a volatile organic content (VOC) not exceeding 250 g/l.

Desirable and advantageous properties of coatings derived from the coating composition of the present invention are provided by the selection of the specific amine-functional polyorganosiloxane in combination with the specific epoxy-functional siloxane oligomer as described and claimed herein, wherein the amounts of the two components are selected such that the ratio of active hydrogen equivalents in the amine-functional polyorganosiloxane to epoxy equivalents in the epoxy-functional organosiloxane oligomer is in a specific range.

Upon application, the coating compositions of the present invention have a short drying time in combination with an adequate viscosity and a suitable pot life. Further, the coating compositions of the present invention, despite comprising the epoxy-functional siloxane oligomer having a low degree of polymerization, provide good protection against corrosion, in combination with UV durability upon long term exposure, as can be seen from high gloss retention and a low Delta E.

Additionally, the coating composition according to the invention can be used as as primer/finish, which allows for replacing a prior art two-coat system with a one-coat system.

As indicated above, the epoxy-functional organosiloxane oligomer comprises units selected from the group of:

$(R^1R^2R^3SiO_{1/2})_a$                                              (i)

$(R^1R^3SiO_{2/2})_b$                                                 (ii)

$(R^1R^1SiO_{2/2})_c$                                                (iii)

$(R^1SiO_{3/2})_d$                                                   (iv)

$(R^3SiO_{3/2})_e$, and                                         (v)

$(SiO_{4/2})_f$                                                        (vi)

wherein
each of a, b, c, d, e and f can be independently 0 or an integer
the number average of the number of units a+b+c+d+e+f in the epoxy-functional siloxane oligomer ranges from 2 to 9;
the number average of a+b+e≥2
the $R^1$ groups can be the same or different and each represent a monovalent hydrocarbon radical having 1-9 carbon atoms, or a $C_1$-$C_6$ alkoxy group,
the $R^2$ groups can be the same or different and each represent an OH group or a $C_1$-$C_6$-alkoxy group,
the $R^3$ groups can be the same or different and each represent a monovalent hydrocarbon radical having 1-11 carbon atoms each $R^3$ group substituted with at least one epoxy group,
wherein an average of at least 70% of the units of the epoxy-functional organosiloxane oligomer comprise an $R^3$ group.

The average degree of oligomerisation of the epoxy-functional organosiloxane oligomer is given by the number average of the number of units a+b+c+d+e+f, which ranges from 2 to 9. A value below 2 is not an oligomer. Surprisingly, even though the degree of oligomerisation is less than 10, the mechanical properties of the coatings obtained from the coating compositions of the present invention are sufficient to provide excellent protection against corrosion in combination with having good UV durability upon long term UV exposure. It may be preferred for the degree of oligomerisation to range from 3 to 9 (i.e. between 3 and 9), more in particular to range from 4 to 9 (i.e between 4 and 9). Alternatively, the degree of oligomerisation may be at most 8, or at most 7.

The degree of oligomerisation/polymerisation mentioned herein is, for the avoidance of doubt, the number average degree of oligomerisation/polymerisation. The degree of oligomerisation and degree of polymerisation can be easily determined by, e.g., Liquid Chromatography (LC)/Liquid Chromatography-Mass Spectrometry (LC-MS). The degree of polymerization is therefore equal to the average number of silicon atoms in the polymer/oligomer.

The number of units (i), (ii), (iii), (iv), (v) and (vi) (i.e. the values of a, b, c, d, e and f) can be determined by $^{29}Si$ and $^1H$ NMR. NMR is commonly used to characterization of oligomers and polymers, as described for example, in Polymer Characterization Physical Techniques, D Campbell, J R White, Published in the USA by Chapman and Hall, 1989.

An average of at least 70% of the units of the epoxy-functional siloxane oligomer contain an $R^3$ group. In other words, an average of least 70% of the units of the epoxy-functional siloxane oligomer (each unit comprising one silicon atom) comprises a monovalent hydrocarbon radical having 1-9 carbon atoms substituted with an epoxy group. Further, the average of the total of a+b+e in the epoxy-functional siloxane oligomer must be at least 2. This is required to ensure that the epoxy-functional siloxane oligomer comprises an adequate number of epoxy-groups. The maximum for the average of the total of a+b+e in the epoxy-functional siloxane oligomer is governed by the average of the total of a+b+c+d+e+f addressed above.

More preferably at least 80% of the units of the epoxy-functional siloxane oligomer comprises an $R^3$ group. Most preferably, at least 90% of the units of the epoxy-functional siloxane oligomer comprises an $R^3$ group. In one embodiment substantially all or all of the units of the epoxy-functional siloxane oligomer comprises an $R^3$ group. The epoxy-functional siloxane oligomer therefore may be classified as a siloxane oligomer having a high epoxy-functionality.

For example, if the epoxy functional siloxane oligomer had a degree of oligomerisation of 10, then the oligomer would comprise an average of 10 units (each unit comprising 1 silicon) and an average of at least 7 (10×0.7=7) of these units would comprise an $R^3$ group. More preferably, at least 8 of the units (10×0.8=8) would comprise an $R^3$ group and most preferably at least 9 of these units (10×0.9=9) would comprise an $R^3$ group.

For example, if the epoxy functional siloxane oligomer had a degree of oligomerisation of 3, then the oligomer would comprise an average of 3 unites (each unit comprising 1 silicon) and an average of at least 2 (3×0.7=2.1 which rounds down to 2) of these unites would comprise a $R^3$ group. Most preferably at least 3 of these units (3×0.9=2.8 which rounds up to 3) would comprise a $R^3$ group.

In the above, the $R^1$ groups can be the same or different and each represent a monovalent hydrocarbon radical having 1-9 carbon atoms or a $C_1$-$C_6$ alkoxy group. The hydrocarbon radical preferably has 1-6 carbon atoms and more preferably 1-4 carbon atoms.
the $R^2$ groups can be the same or different and each represent an OH group or a $C_1$-$C_6$-alkoxy group,
the $R^3$ groups can be the same or different and each represent a monovalent hydrocarbon radical substituted with at least one epoxy group, the monovalent hydrocarbon radical having 1-11 carbon atoms.

Preferably the epoxy group is located at the terminus of the $R^3$ radical. Preferably, $R^3$ groups are substituted with a glycidyl ether group. For example, $R^3$ groups can be the same or different and each represent a monovalent hydrocarbon radical substituted with a glycidyl ether group. Examples of such $R^3$ groups include hexylene glycidyl ether, propylene glycidyl ether and butylene glycidyl ether.

The coating composition according to the invention comprises an amine-functional polyorganosiloxane. An aminefunctional polyorganosiloxane is a resin comprising amine-functional groups attached to a -silicone-oxygen- (—Si—O—) polymer backbone by a hydrocarbon linker. In other-words, an amine-functional polyorganosiloxane has a silicon-oxygen backbone on to which one or more of the hydrocarbon groups are bound. The hydrocarbon groups may be substituted with an amine group. Examples of hydrocarbon groups bound to the silicon-oxygen backbone include therefore, for example, alkyl groups (e.g. $C_1$-$C_9$ alkyl group), and/or aryl groups (e.g. phenyl group), alkyl groups (e.g. $C_1$-$C_9$ alkyl group) substituted with an amine-functional group, and/or aryl groups (e.g. phenyl group) substituted with an amine-functional group. Suitably an average of less than 50% of the silicon atoms of the amine-functional polyorganosiloxane have bound thereon a hydrocarbon group substituted with an amine-functional group. More suitably, an average less than of 40% of the silicon atoms of the amine-functional polyorganosiloxane have bound thereon a hydrocarbon group substituted with an amine-functional group. For example, an average less than of 30% of the silicon atoms in the amine-functional polyorganosiloxane have bound thereon a hydrocarbon group substituted with an amine-functional group. For example, an average of less than 20% of the silicon atoms in the amine-functional polyorganosiloxane have bound thereon a hydrocarbon group substituted with an amine-functional group. For example, an average of less than 10% of the silicon atoms in the amine-functional polyorganosiloxane have bound thereon a hydrocarbon group substituted with an amine-functional group. Typically however the amine-functional polyorganosiloxane comprises at least two (2) amine functional groups. This is required to ensure that the amine-functional polyorganosiloxane comprises an adequate number of amine-groups for curing.

The silicone-oxygen backbone may have a linear, branched or cage-like structure. The average degree of polymerization of the amine-functional polyorganosiloxane is 10 or greater, preferably 15 or greater, preferably 20 or greater, up to a maximum of 40 or a maximum of 50. For example, the average degree of polymerization of the amine-functional polyorganosiloxane may range from 10 to 50, from 10 to 40, from 15 to 50, from 15 to 40, from 15 to 35, from 20 to 35 or from 20 to 40.

The amine-functional polyorganosiloxane therefore may be classified as having a "low" amine-functionality.

Suitable amine-functional polyorganosiloxanes are known in the art. Examples of suitable amine-functional polyorganosiloxanes are those described in WO2005/010076. In one embodiment the amine-functional polyorganosiloxane comprises units selected from the group of

wherein $R^4$ is independently an alkyl group (e.g. $C_1$-$C_9$ alkyl group), an aryl group (e.g. phenyl group) optionally substituted with an amine-functional group; a has a value of less than 0.4; b has a value of greater than 0.15; c has a value of greater than zero to 0.7; d has a value of less than 0.2; the value of a+b+c+d=1; 3 to 50 mole percent of silicon atoms contain aminefunctional hydrocarbon groups in units (i), (ii) or (iii); the —NH— equivalent weight of the aminefunctional polyorganosiloxane is from 100 to 1500; greater than 20 weight percent of unit (ii) is present in the aminefunctional polyorganosiloxane; less than 10 weight percent of unit (ii) are $Me_2SiO_{2/2}$ units in the aminefunctional polyorganosiloxane; and greater than 50 weight percent of silicon-bonded R groups are silicon-bonded aryl groups.

The amine-functional polyorganosiloxane may be in the form of a liquid, solution, or solid at 25° C. A meltable solid may be solid at 25° C., but liquid at 150° C.

In the composition according to the invention the amounts of the amine-functional polyorganosiloxane and the epoxy-functional organosiloxane oligomer are such that the ratio of active hydrogen equivalents to epoxy equivalents in the coating composition is between 0.3:1 to 1.1:1 (H:epoxy). It may be preferred for the ratio between active hydrogen equivalents to epoxy equivalents to be in the range of greater than 0.6:1 but less than 1:1. The active hydrogen equivalent weight (for amines) may be determined in accordance with ASTM D2896. The epoxy equivalent weight may be determined in accordance with ASTM D1652.

The epoxy equivalent weight is the weight of the epoxy functional oligomer required to yield one mole (or one equivalent) of epoxy functional groups.

As epoxy groups are electrophilic in nature, they commonly react with nucleophiles (e.g. amine groups).

For background, during the ring-opening reaction of an epoxide with a nucleophile, a hydrogen atom is transferred from the nucleophile to the oxygen atom of the epoxide. This transferred hydrogen atom is referred to as the "active hydrogen".

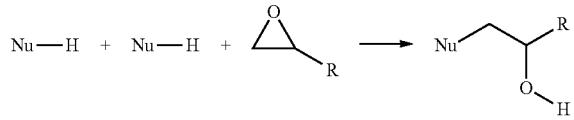

It is common therefore to quote the equivalent weight of the nucleophilic species in terms of the active hydrogen equivalent weight. This is simply the weight of nucleophilic species required to yield one mole (or one "equivalent") of hydrogen atoms transferable to the ring opened epoxy.

The active hydrogen equivalent weight of the amine-functional polyorganosiloxane is therefore the weight of the amine-functional polyorganosiloxane to give one mole (or one "equivalent") of N—H groups.

For the avoidance of doubt, a primary amine group on the amine-functional polyorganosiloxane would have two active hydrogens which can react with two epoxide groups. A secondary amine group on the amine-functional polyorganosiloxane would have one active hydrogen, so it can only react with one epoxide group.

In one embodiment of the present invention, the epoxy equivalent weight of the epoxy-functional siloxane oligomer ranges from 109-430 g/eq. A coating with good properties is obtained when an epoxy-functional siloxane oligomer having an epoxy equivalent value within this range is applied. It may be preferred for the epoxy-functional siloxane oligomer to have an epoxy-equivalent weight of 130 of 300 g/eq, in particular 140 to 200, more in particular 140 to 195, and most preferably 185 to 195.

In one embodiment of the present invention, the active hydrogen equivalent weight of the amine-functional polyorganosiloxane ranges from 100 to 1,500 g/eq. A coating with good properties is obtained when an amine-functional polyorganosiloxane having an active hydrogen-equivalent weight of from 150 to 700, in particular 200 to 400 is used.

The coating composition according to the invention may have a solids content of at least 70 weight % based on the total volume of all the components in the coating composition.

Preferably the calculated solids content is higher than 75% by weight, and more preferably higher than 80% by weight, based on the total volume of all the components in the coating composition.

The coating composition according to the invention may have a volatile organic content (VOC) not exceeding 250 g/l. Preferably the VOC does not exceed 200 g/L. The VOC of the coating composition may be determined according to EPA Federal Method 24.

Despite the high solids content and/or low VOC, the coating composition of the invention can also have a low viscosity. A desirably low viscosity is below 20 poise at 25° C. (50% Relative Humidity), and even more desirably below 15 poise at 25° C., and even desirably below 10 poise at 25° C. as determined using a cone and plate viscometer in accordance with BS 3900 Part A7 2000 (and/or ISO 2884-1 1999) with a shear rate of 10,000 $s^{-1}$. The low viscosity means that the coating it can be applied by standard techniques such as spray, roller or brush.

The coating composition of the invention generally hardens at ambient temperature/conditions or even lower to form a coating, for example from −5 to 50° C., more in particular from −5 to 30° C. (e.g. at 50% Relative Humidity), it is thus suitable for application to large structures where heat-curing is impractical. The coating composition of the invention alternatively may be hardened/cured at elevated temperatures, for example from 30 or 50° C. up to 100° C., if so desired.

It may be preferred for the coating composition according to the invention to have a (calculated) solids content of at least 70%, more in particular at least 75%, still more in particular at least 80%, or even at least 90%. The solids content may be determined in accordance with ASTM D2369.

The coating composition according to the invention may comprise further components, as is known in the art.

For example, the coating composition may comprise one or more pigments, for example but not limited to, titanium dioxide (white pigment), coloured pigments such as yellow or red iron oxide or a phthalocyanine pigment and/or one or more strengthening pigments such as micaceous iron oxide or crystalline silica and/or one or more anticorrosive pigments such as metallic zinc, zinc phosphate, wollastonite or a chromate, molybdate or phosphonate, aluminium flake such as leafing and non-leafing aluminium and/or a filler pigment such as barytes, talc or calcium carbonate.

The presence of aluminium flake such as leafing aluminium has been found to be particularly advantageous, because it has been found that coating compositions according to the invention which comprise aluminium flake provide excellent anticorrosion performance when the composition is exposed to cyclic high and low temperatures.

The composition may also contain one or more thickening agents such as fine-particle silica, bentonite clay, hydrogenated castor oil, or polyamide wax, one or more plasticisers, pigment dispersants, stabilisers, mould releasing agents, surface modifiers, fire retardants, antibacterial agents, antimoulds, levelling agents, and antifoaming agents, etc.

The composition may comprise one or more organic solvents, for example aromatic solvents, alphatic hydrocarbons, alcohols, esters, and ketones. It is within the scope of the skilled person to select suitable solvents. Xylene and aliphatic $C_1$-$C_5$ alcohols such as ethanol and butanol may be mentioned as examples. Solvent is added such that the solids content is at least 70 weight and/or the volatile organic content (VOC) of the coating composition does not exceed 250 g/l.

Organofunctional silanes may be used in the composition according to the invention, although they are not required. Suitable compounds are known in the art. Aminosilanes may be used as catalyst for the moisture curing reaction. Alkoxysilanes may be used to improve dry times and gloss retention. As an example of a suitable aminosilane, aminopropyltrimethoxysilane may be mentioned.

Curing accelerators may be used in the composition according to the invention if so desired, although they are not required. Examples of accelerators include, but are not limited to the following alcohols, phenols, carboxylic acids, sulphonic acids, and salts:

Alcohols: Ethanol, 1-propanol, 2-proanol, 1-butanol, 2-butanol, t-butanol, benzyl alcohol, furfuryl alcohol, and other alkyl alcohols, propanediol, butanediol, glycerol and other polyhydric alcohols, triethanolamine, tri-isopropanolamine, dimethylaminoethanol and other hydroxy tertiary amines.

Phenols: Phenol, 2-chlorophenol, 4-chlorophenol, 2,4-dichlorophenol, 2,4,6-trichlorophenol, 2-nitrophenol, 4-nitrophenol, 2,4-dinitrophenol, 2,4,6-trinitrophenol, 4-cyanophenol, o-cresol, m-cresol, p-cresol, 4-ethylphenol, 4-isopropylphenol, 2,4-dimethylphenol, 3,5-dimethylphenol, nonyl phenol, eugenol, isoeugenol, cardanol and other alkylated phenols, 2,2'-dihydroxybiphenyl, 2,4'-dihydroxybiphenyl, 4,4'-dihydroxybiphenol, bisphenol A, bisphenol F, catechol, 4-t-butyl catechol, resorcinol, 4-hexylresorcinol, orcinol, hydroquinone, naphthalenediol, anthracenediol, biphenylenediol and other substituted dihydric phenols, phloroglucinol, phloroglucine, calixarene, poly(4-vinylphenol) and other polyhydric phenols.

Carboxylic acids: acetic acid, propanoic acid, butyric acid, lactic acid, phenyl acetic acid and other alkyl carboxylic acids, malonic acid, oxalic acid, maleic acid, fumaric acid and other dibasic acids or their monoesters, benzoic acid, 4-t-butyl benzoic acid, salicylic acid, 3,5-dichlorosalicylic acid, 4-nitrobenzoic acid and other aromatic acids.

Sulphonic acids: Methanesulphonic acid and other alkyl sulphonic acid, p-toluenesulphonic acid, 4-dodecylbenzenesulphonic acid, and other aromatic sulphonic acids, naphthalene disulphonic acid, di-nonyl naphthalene disulphonic acid and other polyhydric sulphonic acids.

Salts: Calcium nitrate, calcium naphthenate, ammonium thiocyanate, sodium thiocyanate, potassium thiocyanate, imidazolinium thiocyanate, lithium tetrafluoroborate, lithium bromide, lithium trifluoroacetate, calcium chloride, ytterbium triflate, lithium perchlorate, zinc triflate, lithium nitrate. For all these salts, the cation could be interchanged with lithium, sodium or potassium.

The composition may contain catalysts for the moisture curing of siloxanes. Examples of catalysts that can be used include, but are not limited to the carboxylic acid salts of various metals, such as tin, zinc, iron, lead, barium, and zirconium. The salts preferably are salts of long-chain carboxylic acids, for example dibutyltin dilaurate, dibutyltin dioctoate, iron stearate, tin (II) octoate, and lead octoate. Further examples of suitable catalysts include organobismuth and organotitanium compounds and organo-phosphates such as bis(2-ethyl-hexyl)hydrogen phosphate. Other possible catalysts include chelates, for example dibutyltin acetoacetonate. Further, the catalyst may comprise a halogenated organic acid which has at least one halogen substituent on a carbon atom which is in the alpha-position relative to the acid group and/or at least one halogen substituent on a carbon atom which is in the alpha-position relative to the acid group, or a derivative which is hydrolysable to form such an acid under the conditions of the condensation reaction.

Catalysts may also be tertiary amines, like 1,8-diazabicyclo[5.4.0]undec-7-ene, triethylene diamine, benzyldimethylamine, triethanolamine, dimethylaminoethanol, and tris(dimethylaminomethyl)phenol; imidazoles like 1-methylimidazole, 2-methylimidazole, 2-phenylimidazole, 2-phenyl-4-methylimidazole, 2-ethyl-4-methyl imidazole and 2-heptadecylimidazole and diazabicyclo octane.

If so desired, the coating composition can contain other additives known in the art. Examples of suitable additives include HALS (hindered amine light stabilizers), UV-stabilisers, anti-oxidants, and corrosion inhibitors.

In one embodiment of the present invention, the coating composition has a drying time of less than 10 hours under ambient conditions (ambient conditions is defined above) to the extent that water can be sprayed on to the coating or the coating can be physically handled without disrupting the coating surface. The time for the coatings to dry can be measured by BK dry track recorder (ASTM D 5895).

Coating composition according to the present invention is provided in two parts, the first part comprising the amine-functional polyorganosiloxane and the second part comprising the epoxy-functional organosiloxane oligomer.

In other words, the composition according to the invention is a two-pack system. The use of this two-pack system wherein the two packs being combined just before application onto the substrate is preferred, because it allows the composition to have a high solids content and/or a low VOC in combination with a high stability.

The coating composition can be applied onto a substrate in manners known in the art. Suitable manners include, but are not limited to, spraying, rolling, brushing and dipping.

The coating composition will generally be applied in such a manner that after drying a layer thickness of 50 to 300 µm is obtained, in particular a layer thickness of 75 to 200 µm.

Suitable substrates for treating with the coating composition according to the invention are metal substrates, concrete substrates, polymer substrates or wood substrates. The treatment of metal substrates is preferred.

Another aspect of the present invention is a method of coating a substrate comprising mixing the first and second parts of the coating composition to form a mixture, applying a layer of the mixture to a substrate, and allowing the layer to harden to form a coating. Preferably, the layer is allowed to harden at ambient temperature.

In one embodiment the coating composition according to the invention is a primer coating, that is, a coating which is applied directly over an uncoated substrate, with a further coating composition being applied over a layer of the coating composition according to the invention. This is particularly advantageous where the substrate is a metal substrate, in view of the good anti-corrosive properties of the composition according to the invention.

In another embodiment, the coating composition according to the invention may also be used as a finish, that is, a coating which is applied over a substrate which has been provided with one or more coating layers, wherein no further coating layers are applied over the coating composition according to the invention. The coating composition according to the invention is particularly suitable for this use in view of its high UV resistance and gloss retention.

Since the coating composition has properties that are suitable for use as a primer and a finish, it may also be used as a "primer-finish". This is a coating layer which is applied directly over an uncoated substrate with no further coating layers being applied over that coating layer.

The present invention also pertains to an object coated with the coating composition described above. Examples of suitable objects are planes, trains, automobiles, ships, tanks, bridges, pipes, oil rigs, FPSO (Floating Production, Storage and Offloading) etc, and other traditional performance coating end uses.

The invention will be elucidated by the following examples, without being limited thereto or thereby.

EXAMPLE 1: INVESTIGATION INTO DRY TIMES

A paint base was prepared using the materials presented in Table 1.1. A high-speed disperser, Dispermat Model AE01-M-EXS, was used with the $TiO_2$ being ground into the resin at 4000 rpm until 50µ grind is achieved. Generally samples were prepared in either 750 mL or 250 mL tins using a 40 mm diameter mixer blade. The amine functional polyorganosiloxane had an Amine Hydrogen Equivalent Weight (AHEW) of 255 gmol$^{-1}$. The paint base had an AHEW of 604 gmol$^{-1}$.

TABLE 1.1

| Material | Weight (g) |
|---|---|
| Amine-functional polyorganosiloxane | 150.0 |
| Xylene | 16.66 |
| Titanium dioxide | 188.69 |

The paint base above was then used in the formulation of Table 1.2, with a calculated VOC of 90.4 gL$^{-1}$. The VOC was calculated by the addition of the solvent present in paint mixture to the alcohol evolved upon the siloxane condensation reaction that occurs upon film formation.

TABLE 1.2

| Material | Weight (g) |
|---|---|
| Paint base (described in Table 1.1) | 9.35 |
| Alkoxy-functional polyorganosiloxane | 1.59 |
| Aminopropyltrimethoxysilane (APTMS) | 0.493 |
| Epoxy-functional siloxane oligomer | 5.0 |

Two different types of epoxy-functional organosiloxane oligomer were used, with different degrees of oligomerisation. Both oligomers were prepared from the same two monomers, monomer a and monomer b. For monomer a, R1 was a methyl group, R2 was a hydroxyl group and R3 was a propyl glycidyl ether group. For monomer b, R1 was a methyl group, R3 was a propyl glycidyl ether group and there was no R2.

Type 1 had a degree of oligomerisation of less than 10, in accordance with the invention with a ratio of a:b of 2:3.15. Type 2 had a degree of oligomerisation above 10, so it is comparative. Both Epoxy functional siloxanes had an epoxy equivalent weight of 190 gmol$^{-1}$.

The alkoxy-functional polyorganosiloxane was liquid methoxy-functional polyorganosiloxane with a theoretical Si content of 87%. It had a specific gravity of 1.156 at 25° C., a viscosity of 120 cSt at 25° C. and a weight average molecular weight of 1400.

The stoichiometry of the system (when including the amine contribution from the APTMS) was 0.798 equivalents of amine to 1 equivalent epoxy or 79.8%.

Viscosities of the paint compositions were measured using a cone and plate viscometer in accordance with BS 3900 Part A7 2000 with a shear rate of 10,000 s$^{-1}$. Dry times were assessed at 10° C./80% relative humidity using both a BK dry-track recorder. Results are presented in table 1.3.

TABLE 1.3

| Sample | Mix Viscosity (Poise) | Time to hard dry (hours) |
|---|---|---|
| Type 1 (invention) | 4 | 8 |
| Type 2 (comparative) | 5 | 14 |

As can be seen from Table 1.3, the paint composition according to the invention, which comprised an epoxy-functional organosiloxane oligomer with a degree of oligomerisation of less than 10 has a time to hard dry which is substantially reduced as compared to the comparative composition, while the mix viscosity directly after manufacture was such as is suitable for standard paint application.

This result is surprising since it has been established both practically and theoretically since the early-mid 20th century that in step-growth polymerisations (such as epoxy amine curing processes), reactivity of functional groups is independent of the size of molecule to which it is attached (Principles of Polymerization (4th Ed.), George Odian, Publisher: Wiley-Interscience, Chapter 2, Part 2-1: Reactivity of Functional Groups, p 40-44).

EXAMPLE 2: ANTICORROSIVE TESTING

Using the same paint base as in Example 1 above the paint was prepared with a calculated VOC of 90.4 gL$^{-1}$ and a composition as presented in Table 2.1.

TABLE 2.1

| Material | Weight (g) | Weight (%) |
|---|---|---|
| Paint base (described in Table 1.1) | 35.51 | 57 |
| Alkoxy-functional polyorganosiloxane | 6.06 | 10 |
| Aminopropyltrimethoxysilane | 1.87 | 3 |
| Epoxy-functional organosiloxane oligomer | 19.0 | 30 |

The epoxy-functional siloxane oligomer was the oligomer used in Example 1 with a degree of polymerisation of less than 10.

Materials were mixed using a spatula for 1-2 minutes then applied to a series of 6"×4" steel panels which had been grit blasted to Sa 2½ standard. The paint was applied using a 300 µm draw down bar and the samples left to cure for 7 days before a 3 mm circular defect was introduced to the coating after which the panels were placed into accelerated testing.

Anticorrosive performance was assessed by visual inspection of panels exposed in salt spray chambers running a Prohesion® cycle according to ASTM G85 Annex A5 of:
  1 hour condensation cycle with an aqueous solution of 0.35% $(NH_4)_2SO_4$+0.05% NaCl at ambient temperature.
  1 hour dry cycle at 35° C.

Panels were assessed regularly according to ISO 4628/2 and ASTM D714-02 and after 4000 hours were found to exhibit no blistering. The results are presented in Table 2.2.

TABLE 2.2

| | ISO 4628/2 | | ASTM D714-02 | |
|---|---|---|---|---|
| Hours on test | Density | Size | Density | Size |
| 0 | 0 | — | None | — |
| 400 | 0 | — | None | — |
| 650 | 0 | — | None | — |
| 850 | 0 | — | None | — |
| 1650 | 0 | — | None | — |
| 2300 | 0 | — | None | — |
| 2700 | 0 | — | None | — |
| 3500 | 0 | — | None | — |
| 4000 | 0 | — | None | — |

From the results in Table 2.2 it can be seen that even after prolonged periods of time in an accelerated aging test no corrosion was observed.

EXAMPLE 3: DURABILITY TESTING

Using the same paint base as above a paint was prepared with a calculated VOC of 90.4 gL$^{-1}$. The composition is presented in Table 3.1 below.

TABLE 3.1

| Material | Weight (g) | Weight (%) |
|---|---|---|
| HALS (hindered amine light stabilizers) | 0.166 | 1 |
| Paint base (table 1.1) | 9.35 | 56 |
| Alkoxy-functional polysiloxane | 1.59 | 10 |
| Aminopropyltrimethoxysilane | 0.493 | 3 |
| Epoxy-functional siloxane oligomer | 5.0 | 30 |

The epoxy-functional siloxane oligomer was the oligomer used in Example 1 with a degree of polymerisation of less than 10.

Materials were then mixed using a spatula for 1-2 minutes then applied to a series of 6"×3" aluminium Q panels which had been abraded with wet/dry paper and washed with acetone to remove any dirt. The paint was applied using a 300 µm draw down bar and the samples were left to cure for 7 days before placing into accelerated weathering.

Accelerated weathering was undertaken using a QUVa cabinet from Q-Lab following ASTM G154. The panels were exposed to a cycle of 4 hours UV exposure @ 60° C. followed by 4 hours condensation @ 45° C. This cycle was repeated continuously.

The results are presented in Table 3.2. All gloss measurements quoted are for 60° gloss and were measured using Sheen Tri-glossmaster. For delta E calculations, L, a and b values were measured using datacolor check II instrument.

TABLE 3.2

| Hours on test | % Gloss retention | Delta E |
|---|---|---|
| 500 | 95.8 | 1.94 |
| 1000 | 91.3 | 1.73 |
| 1,600 | 91.2 | 1.61 |
| 3,000 | 89.9 | 1.67 |
| 6,500 | 86.8 | 1.49 |
| 11,000 | 84.25 | 1.45 |

The data in Table 3.2 shows that the gloss retention is high and the Delta E of the coating composition according to the invention is low, even after prolonged testing.

The invention claimed is:
1. A coating composition made from the admixture of (1) an amine-functional polyorganosiloxane having a number average degree of polymerization of 10 or more, and (2) an epoxy-functional organosiloxane oligomer, wherein the epoxy functional organosiloxane oligomer comprises units selected from the group consisting of:

$(R^1R^2R^3SiO_{1/2})_a$                  (i)

$(R^1R^3SiO_{2/2})_b$                 (ii)

$(R^1R^1SiO_{2/2})_c$                 (iii)

$(R^1SiO_{3/2})_d$                    (iv)

$(R^3SiO_{3/2})_e$, and              (v)

$(SiO_{4/2})_f$                       (vi)

wherein
each of a, b, c, d, e and f is independently 0 or an integer;
the number average of the number of units a+b+c+d+e+f in the epoxy functional organosiloxane oligomer ranges from 2 to 9;
the number average of a+b+e≥2;
the $R^1$ groups are the same or different and each represents a monovalent hydrocarbon radical having 1-9 carbon atoms or a $C_1$-$C_6$ alkoxy group,
the $R^2$ groups are the same or different and each represents represent an OH group or a $C_1$-$C_6$-alkoxy group;
the $R^3$ groups are the same or different and each represents a monovalent hydrocarbon radical having 1-11 carbon atoms, each $R^3$ group substituted with at least one epoxy group;
wherein an average of at least 70% of the units of the epoxy-functional organosiloxane oligomer comprise an $R^3$ group,
and wherein the amounts of the amine-functional polyorganosiloxane and the epoxy-functional organosiloxane oligomer are such that the ratio of active hydrogen equivalents to epoxy equivalents in the coating composition is between 0.3:1 to 1.1:1.

2. The coating composition according to claim 1 wherein the coating composition has at least one of a solids content of at least 70 weight % and/or a volatile organic content (VOC) not exceeding 250 g/l, determined according to EPA Federal Method 24.

3. The coating composition according to claim 2 wherein the amine-functional polyorganosiloxane has an active hydrogen equivalent weight of from 100 to 1,500 g/eq.

4. The coating composition according to claim 2, wherein the epoxy equivalent weight of the epoxy-functional organosiloxane oligomer ranges from 109-430 g/eq.

5. The coating composition according to claim 2, wherein the coating composition has a viscosity of less than 15 Poise at 25° C., determined using a cone and plate viscometer in accordance with BS 3900 Part A7 2000 (and/or ISO 2884-1 1999) with a shear rate of 10,000 s$^{-1}$.

6. The coating composition according to claim 1 wherein the amine-functional polyorganosiloxane has an active hydrogen equivalent weight of from 100 to 1,500 g/eq.

7. The coating composition according to claim 6, wherein the ratio of active hydrogen equivalents to epoxy equivalents in the coating composition is greater than 0.6:1 but less than 1:1.

8. The coating composition according to claim 6, wherein an average of less than 50% of the silicon atoms in the amine-functional polyorganosiloxane have bound thereon a hydrocarbon group substituted with an amine-functional group.

9. The coating composition according to claim 1, wherein the epoxy equivalent weight of the epoxy functional organosiloxane oligomer ranges from 109-430 g/eq.

10. The coating composition according to claim 1 wherein the coating composition hardens to form a coating in ambient conditions.

11. The coating composition according to claim 1, wherein the coating composition has a viscosity of less than 15 Poise at 25° C., determined using a cone and plate viscometer in accordance with BS 3900 Part A7 2000 (and/or ISO 2884-1 1999) with a shear rate of 10,000 s$^{-1}$.

12. The coating composition according to claim 1, wherein the ratio of active hydrogen equivalents to epoxy equivalents in the coating composition is greater than 0.6:1 but less than 1:1.

13. The coating composition according to claim 1, wherein an average of less than 50% of the silicon atoms in the amine-functional polyorganosiloxane have bound thereon a hydrocarbon group substituted with an amine-functional group.

14. The coating composition according to claim 1 wherein the amine-functional polyorganosiloxane comprises units selected from the group consisting of $(R^4_3SiO_{1/2})_a$                    (i)

$(R^4_2SiO_{2/2})_b$                    (ii)

$(R^4SiO_{3/2})_c$, and             (iii)

$(SiO_{4/2})_d$                       (iv)

wherein $R^4$ is independently an alkyl group or an aryl group, optionally substituted with an amine group; a has a value of less than 0.4; b has a value of greater than 0.15; c has a value of greater than zero to 0.7; d has a value of less than 0.2; the value of a+b+c+d=1; 3 to 50 mole percent of silicon atoms contain amine functional hydrocarbon groups in units (i), (ii) or (iii); the —NH— equivalent weight of the amine functional polyorganosiloxane is from 100 to 1500; greater than 20 weight percent of unit (ii) is present in the amine functional polyorganosiloxane poly siloxane; less than 10 weight percent of unit (ii) are $Me_2SiO_{2/2}$ units in the amine functional polyorganosiloxane; and greater than 50 weight percent of silicon-bonded R groups are silicon-bonded aryl groups.

15. The coating composition according to claim 1 further comprising one or more components selected from the group consisting of adhesion promoting agents, fillers, pigments, solvents, curing accelerators and additives.

16. The coating composition according to claim 1, further comprising aluminium flake.

17. A kit comprising, as separate parts, a first part comprising an amine-functional polyorganosiloxane and a second part comprising an epoxy-functional organosiloxane oligomer, wherein the amine-functional polyorganosiloxane and the epoxy-functional organosiloxane are according to claim 1.

18. A method of coating a substrate comprising mixing the first and second parts of the kit as defined in claim 17 to form a mixture, applying a layer of the mixture to the substrate, and allowing the layer to harden to form a coating.

19. The coating composition according to claim 1, wherein the coating composition is a primer, an intermediate, a finish or a primer/finish coating.

20. An object coated with the coating composition according to claim 1.

* * * * *